United States Patent [19]

Folger et al.

[11] 4,428,630
[45] Jan. 31, 1984

[54] SEALED BEARING AND SELF-VENTING SEAL THEREFOR

[75] Inventors: Russell F. Folger, North Canton; Henry J. Wasik, Massillon, both of Ohio

[73] Assignee: The Timken Company, Canton, Ohio

[21] Appl. No.: 394,867

[22] Filed: Jul. 2, 1982

[51] Int. Cl.³ .................. F16C 33/76; F16J 15/32
[52] U.S. Cl. .................. 308/187.2; 277/29; 277/47; 277/153
[58] Field of Search ............... 308/187, 187.1, 187.2; 277/28, 29, 50, 70, 71, 72 R, 79, 152, 153, 166, 47, 37

[56] References Cited

U.S. PATENT DOCUMENTS

| | | | |
|---|---|---|---|
| 2,830,832 | 4/1958 | Moorman et al. | 277/29 |
| 2,851,315 | 9/1958 | Zavoda | 308/187.1 |
| 2,977,138 | 3/1961 | Brittain | 277/29 |
| 3,494,681 | 2/1970 | Anderson et al. | 308/187.2 X |
| 3,572,379 | 3/1971 | Popa et al. | 277/29 |
| 3,685,838 | 8/1972 | Malmstrom | 308/187.1 |
| 3,748,003 | 7/1973 | Barber | 308/187.2 |
| 3,869,181 | 3/1975 | Barber | 308/187.2 |
| 4,106,781 | 8/1978 | Benjamin et al. | 277/152 |

FOREIGN PATENT DOCUMENTS 1241605 8/1971 United Kingdom .

Primary Examiner—Stuart S. Levy
Assistant Examiner—David J. Werner
Attorney, Agent, or Firm—Gravely, Lieder & Woodruff

[57] ABSTRACT

A bearing having an outer race provided with end bores, inner races provided with wear surfaces located within the end bores, and rolling elements arranged in two rows between the races, is closed at its ends by seals which prevent excessive pressure from developing within the bearing during operation or relubrication. Each seal includes a metal case having an axial wall and pair of spaced apart radial walls. The axial wall is pressed into one of the end bores of the outer race, whereas the radial walls form a chamber that communicates with the interior of the bearing through apertures in the inner radial wall. An elastomeric seal element is bonded to the inner radial wall and it includes a primary seal lip that extends beyond the axial wall of the case and contacts the wear surface axially inwardly from the radial wall, a secondary lip that contacts the wear surface in the region of the inner radial wall, and a vent lip that extends toward and normally contacts the outer radial wall so as to close the end of the chamber that is between the two radial walls. However, when the pressure within the chamber, and the bearing as well, increases to a predetermined magnitude, which is considerably less than the pressure at which the seal will be dislodged or the primary lip damaged, the vent lip will flex and relieve the pressure. Thus, the pressure within the bearing never exceeds the predetermined magnitude.

23 Claims, 4 Drawing Figures

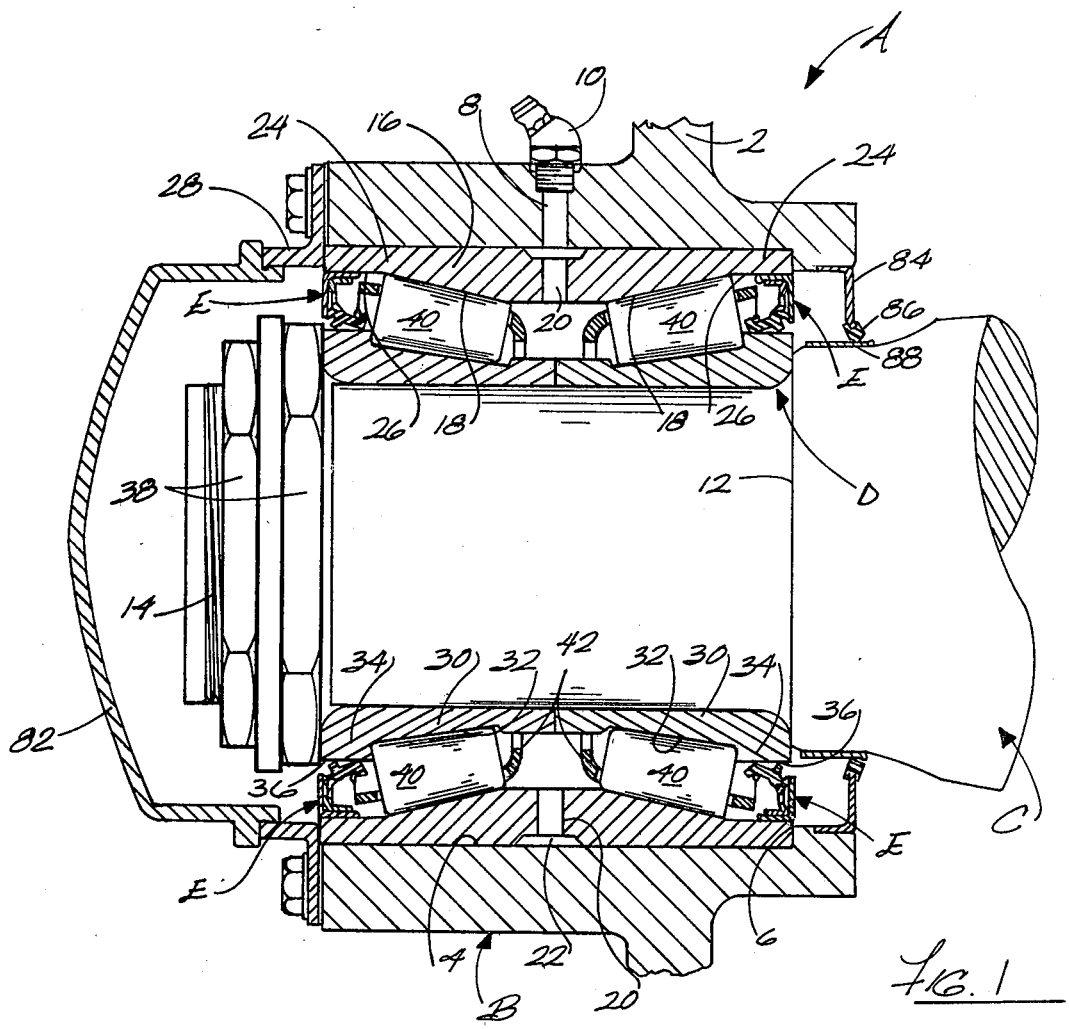
FIG. 1
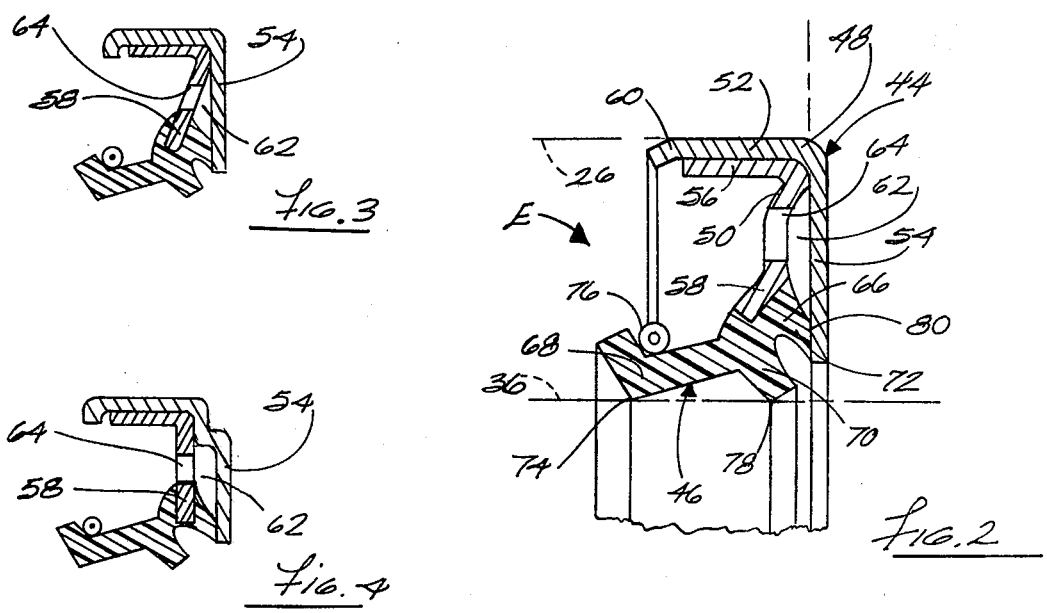
FIG. 3
FIG. 2
FIG. 4

SEALED BEARING AND SELF-VENTING SEAL THEREFOR

BACKGROUND OF THE INVENTION

This invention relates in general to seals and more particularly to a seal that is capable of venting the space isolated by it and to a sealed bearing in which the seal is installed.

The bearings on which the wheels of large over-the-road trucks and trailers revolve are housed within cavities that are isolated at their ends by lip seals. The typical lip seal has a case that is normally pressed into the wheel hub and an elastomeric lip that bears against a wear surface along an axle or spindle. The lip is somewhat delicate and to protect it from damage and to further orient it the most efficient position for sealing, it is turned axially inwardly into the isolated cavity. Thus, a significant portion of the lip is exposed to the cavity, and in many seals a garter spring encircles the exposed portion of the lip to insure that the lip remains in contact with the wear surface.

Sometimes the inwardly directed lip seals too effectively, and as a result the entire seal may be damaged. In this regard, truck brakes are located next to and indeed are mounted on the wheel hubs. Braking generates a considerable amount of heat, and if the braking is sustained, the heat will soak back into the hub and elevate the temperature in the bearing cavity. This in turn elevates the pressure within the cavity, and the elevated pressure forces the seal lip against the wear surface with even greater force. Thus, excessive friction may develop between the seal lip and wear surface, causing deterioration of the seal lip.

Since conventional lip seals react adversely to elevated pressures, they do not lend themselves to simple expedients for relubricating the bearings that they isolate, that is conventional lubrication fittings, for the lubricant must be forced through these fittings under considerable pressure. While it is desirable to relubricate wheel bearings from time to time, the advantages afforded by having simple lubrication fittings in the hubs, are more than offset by the damage that will result if the bearings in the hub receive excessive lubrication. In particular, without the incorporation of a venting means, the introduction of a lubricant through a fitting and into a bearing will increase the pressure within that bearing and of course cause the seal lips at the ends of the bearing cavity to bear against their respective wear surfaces with substantial force. Indeed, the pressure may become great enough to invert the seal lips or dislodge an entire seal from the hub. Instead of providing lubrication and vent fittings for quickly lubricating the bearings, the usual practice is to repack the bearings with grease about every 20,000 to 30,000 miles by disassembling the hub. Wheel bearings that operate in oil run longer, although even they are disassembled, cleaned, and inspected at about every 150,000 miles, to thereupon be reassembled with the proper amount of oil.

The purchase of a truck or trailer involves the expenditure of a significant amount of capital, and whenever a truck or trailer is laid up for bearing maintenance, this capital is not to be put to effective use. Even so, it costs considerably less in terms of direct labor and down time to relubricate bearings using conventional procedures than it does to replace a bearing damaged by the absence of adequate lubrication.

SUMMARY OF THE INVENTION

One of the principal objects of the present invention is to provide a seal containing vents that will relieve pressure in the region isolated by the seal, with the pressure relief occuring at a pressure significantly below that at which the seal will be dislodged or otherwise damaged by elevated pressure in the isolated region. Another object is to provide a seal of the type stated that is ideally suited for use in connection with bearings, particularly the bearings in the wheels of trucks and other automotive equipment. A further object is to provide a seal of the type stated that enables bearings to be relubricated without disassembling them or the components in which they are installed and without damage to the seals. An additional object is to provide a seal of the type stated in which the venting occurs along a static seal surface. Still another object is to provide a seal of the type stated that greatly extends the intervals between major maintenance procedures on bearings. Yet another object is to provide a seal that increases the reliability of the bearing isolated by the seal. Another object is to provide a seal that lends itself to a preset, presealed and long life bearing. Still another object is to provide a sealed bearing that utilizes a seal of the type stated. Still another object is to provide a seal of the type stated that is simple in construction and easy to manufacture. Yet another object is to provide a bearing assembly in which the ends of the bearing are closed by a seal of the type stated. These and other objects and advantages will become apparent hereinafter.

DESCRIPTION OF THE DRAWINGS

In the accompanying drawings which form part of the specification and wherein like numerals and letters refer to like parts wherever they occur:

FIG. 1 is a sectional view of a bearing assembly containing a double row tapered roller bearing that is closed at its ends with self-venting seals constructed in accordance with and embodying the present invention;

FIG. 2 is an enlarged fragmentary sectional view showing one of the seals in cross-section;

FIG. 3 is a sectional view of a modified seal; and

FIG. 4 is a sectional view of another modified seal.

DETAILED DESCRIPTION

Referring now to the drawings, a wheel assembly A (FIG. 1) includes a hub B, a spindle C about which the hub B rotates, and a bearing D between the hub B and spindle C to reduce the friction between the two so that the hub B will rotate easily on the spindle C. In addition, the wheel assembly A includes seals E which close the ends of the bearing D to retain a lubricant within the bearing D and to likewise exclude contaminants from the lubricant as well as from the bearing D itself. Even so, the seals E are self-venting in the sense that they allow fluid, whether it be air or lubricant, to escape from the bearing after that fluid reaches a predetermined pressure which is well below the pressure that will damage the seals E or perhaps dislodge them. As a consequence, the bearing D may be lubricated by forcing lubricant into it while it is fully assembled in the assembly A, that is with the seals E closing its ends. Furthermore, the bearing D may operate at high temperatures without excessive pressures developing within it.

The hub B has a flange 2 to which wheel rims and brake drums are bolted and also a bore 4 which at one end terminates at a shoulder 6. The bore 4 is large enough to snugly receive the bearing D which fits into it and against the shoulder 6. Midway between the ends of its bore 4, the hub B is provided with a radially directed lubrication hole 8, and at the outside surface of the hub B a lubricant fitting 10 is threaded into the hole 8. In this regard, the fitting 10 is offset from the flange 2 such that it is easily accessible.

The spindle C at its end projects through the hub B an through the bearing D as well. At the inboard end of the bearing D, the spindle C has a shoulder 12. The outboard end, however, projects beyond the bearing where it is provided with threads 14.

The bearing D is a double row tapered roller bearing that is self-contained and further unitized, at least for handling purposes, only the seals E. Being a double row tapered roller bearing, it is capable of transmitting radial loads as well as thrust loads in both axial directions between the spindle C and hub B. The bearing D includes a double cup 16 that fits snugly in the bore 4 of the hub B and has a pair of inwardly presented raceways 18 arranged in the indirect configuration, that is with their small diameter ends presented toward each other near the axial center of the bearing D and their large diameter ends presented away from each other near the ends of the bearing D. The two raceways 18 do not meet at the center of cup 16, but are instead separated by a surface out of which several radially directed holes 20 open. The holes 20 lead out to a circumferential groove 22 which aligns with the hole 8 in the hub B. Thus, a fluent lubricant that is forced through the fitting 10 will pass in order through the hole 8, the groove 22, and the holes 20, so as to enter the bearing D between the small ends of the two cup raceways 18.

At its ends the cup 16 is provided with extensions 24 having end bores 26 that merge with the large ends of the cup raceways 18. The seals E fit snugly into the end bores 26 and accordingly are fixed in position with respect to the cup 16. The inboard cup extension 24 bears against the shoulder 6 on the hub B, while the outboard cup extension 24 is located opposite to a ring 28 that is bolted against the end of the hub B and extends radially inwardly past the surface of the bore 4. Thus, the double cup 16 is captured between the shoulder 12 and the ring 28.

In addition to the double cup 16, the bearing D includes a pair of cones 30 that fit around the spindle C, each one being located directly inwardly from a different raceway 18 of the cup 16. Each cone 30 has an outwardly presented raceway 32 that tapers in the same direction as the surrounding cup raceway 18 and a thrust rib 34 at the large end of its raceway 32. The thrust ribs 34 have outwardly presented cylindrical surfaces 36 which lie within the end bores 26 of the double cup 16 to serve as wear surfaces against which the seals E bear. The inboard cone 30 at its back face bears against the shoulder 12 on the spindle C, while the back face of the outboard cone 30 lies along the spindle threads 14. Indeed, the threads 14 hold a nut 38 which is tightened down against the back face of the outboard cone 30. Thus, the two cones 30 are clamped between the shoulder 12 and nut 38 and abut at the front faces which are located at the axial midpoint of the bearing D.

Aside from the double cup 16 and the two cones 30, the bearing D includes tapered rollers 40 which are arranged in two rows between the two sets of opposing cup and cone raceways 18 and 32. The raceways 18 and 32 are disposed such that the rollers 42 of the two rows run on apex, meaning that if the rollers 42 of either row were extended to an apex, those apexes would lie at a common point along the axis of rotation for the bearing D. The large diameter ends of the rollers 40 bear against the cone thrust ribs 34 which determine the axial positioning of the rollers 40. The rollers 40 inherently pump lubricants that are within the bearing D toward the cone thrust ribs 34.

Finally, the bearing D has a cage 42 around each cone 30 to maintain the proper spacing between the tapered rollers 40 of each row and to further prevent the rollers 40 from falling away from their respective cones 30 when the cones 30 are withdrawn from the double cup 16.

The two seals E close the annular spaces at the ends of the bearing D and thereby isolate the cavities in which the two rows of tapered rollers 40 revolve. They further prevent the cones 30 and the rollers 40 from being withdrawn from the double cup 16, and thereby unitize the bearing D, at least for handling purposes. The seals E fit snugly into end bores 26 of the cup extensions 24 and extend radially inwardly to the cylindrical wear surfaces 36 on the cone thrust ribs 34, against which they bear to establish a barrier while the cup 16 rotates relative to the cones 30 or vice-versa. Each seal E includes a metal seal case 44 which fits into one of the end bores 26 and an elastomeric seal element 46 which is bonded to the seal case 44 and bears against that wear surface 36 that lies within the particular end bore 26.

The seal case 44 (FIG. 2) of each seal E has outer and inner members 48 and 50, respectively, both of which are generally L-shaped in cross-sectional configuration, with the inner member 50 being generally nested in the outer member 48. As such, the outer member 48 has an axially directed wall 52 that fits within the end bore 26 and a radially directed wall 54 that projects inwardly toward the wear surface 36 of the cone thrust rib 34 but does not contact that surface. The diameter of the axial wall 52 is slightly greater than the diameter of the cup end bore 26, so that the seal case 44 must be forced into the bore 26, and when installed an interference fit exists between the axial wall 52 and the surface of the end bore 26.

The inner member 50 likewise has an axially directed wall 56 and a radially directed wall 58. The axial wall 56 fits snugly within the axial wall 52 of the outer member 48, there being an interference fit between the two, and in effect the two axial walls 52 and 56 are one. Even so, the axial wall 56 is slightly shorter than the axial wall 52 of the outer member 48 so that the outer axial wall 52 extends beyond the inner axial wall 56. Here the outer axial wall 52 is deformed inwardly to provide a chamfer 60 which facilitates installation of the seal E in the bore 26 and secures the inner member 50 within the outer member 48. In this respect, the axial wall 56 of the inner member 50 is captured within the outer member 48, in that it extends from the radial portion 54 at its one end to the chamfer 60 at its other end.

In contrast to the two axial walls 52 and 56, which fit snugly together and function as a single wall for holding the seal E in the end bore 26 of the double cup 16, the two radial walls 54 and 58 are for the most part spaced apart. In this regard, the radial wall 54 of the outer member 48 extends directly inwardly and lies in a plane that is normal to the axis of rotation. The radial wall 58 of the inner member 50, on the other hand, is at least in part oblique to the radial portion 54 of the outer member, and although the two radial walls 54 and 58 abut adjacent to the axial walls 52 and 56, they are otherwise spaced apart so that a venting chamber 62 exists between them. Generally midway between its inner and outer margins, the radial wall 58 of the inner member 50 has several apertures 64 which provide communication between the venting chamber 62 and the interior of the bearing D, that is the region occupied by the rollers 40.

The radial wall 58 of the inner member 50 is somewhat narrower than the radial wall 54 of the outer member 48 so that it is spaced farther from the wear surface 36. It is in the region of the inner margin for the radial wall 58 of the inner member 50 that the elastomeric seal element 46 is bonded to the seal case 44.

The elastomeric seal element 46 closes the gap between the seal case 46 and the wear surface 36 and establishes a barrier along the latter, notwithstanding that the movement occurs between the seal case 44 and wear surface 36. Basically, the seal element 46 includes a base 66 which is bonded to the inner radial wall 58 generally along its inner edge and at both faces along that edge as well. Even so, the base 66 is disposed entirely inwardly from the apertures 64 so that the apertures 64 remain unobstructed. In addition to the base 66, the seal element 46 has three seal lips, namely a primary lip 68, a secondary lip 70, and a vent lip 72, all of which are formed integral with and project from base 66.

The primary lip 68 extends generally axially from the base 66 and toward the tapered rollers 40. Its inwardly presented surface converges toward an edge 74 along which the lip 68 contacts the wear surface 36, thereby forming a barrier which serves primarily to prevent the lubricant from escaping from the interior of the bearing D. The outwardly presented surface of the primary lip 68 is exposed to the interior of the bearing, and contains an annular groove through which a garter spring 76 extends. The spring 76 urges the sealing edge 74 of the primary lip 68 against the wear surface 36 and in so doing acts in conjunction with the natural resiliency of the elastomer from which the seal element 46 is molded. Moreover, the axial disposition of the primary lip 68 is such that any increase in pressure within the interior of the bearing D, whether it be produced by an elevation in operating temperature or by the introduction of too much lurbicant through holes 20, will likewise cause the sealing edge 74 to bear against the wear surface 36 with greater force.

The secondary lip 70 projects obliquely from the base 66, generally away from the primary lip 68, and contacts the wear surface 36 along a sealing edge 78. It serves primarily to exclude dust, water, and other contaminants from the interior of the bearing D.

The vent lip 72 likewise extends obliquely from the base 66 generally in the same direction as the secondary lip 70, but in contrast to the secondary lip 70, it does not contact the wear surface 36. Instead, it has a sealing face 80 that contacts the inwardly presented face of the radial wall 54 of the seal case 44 along a circular area that is concentric with respect to the primary and secondary lips 68 and 70. As such, the vent lip 72 extends across and closes the chamber 62 and indeed it forms one wall of that chamber. The natural resiliency of the elastomer holds the vent lip 72 against the radial portion 54 of the seal case 44 where a static seal is formed, and the inclination of the lip 72 with respect to the wall 54 is such that an increase in the ambient pressure or a decrease in the pressure within the bearing D will merely cause the lip 72 to be urged against the outer radial wall 54 will greater force. On the other hand, an increase in pressure within the venting chamber 62 above that of the ambient pressure by a predetermined amount will cause the vent lip 72 to deflect so as to separate the face 80 from the wall 54 and thereby relieve the pressure in the chamber 62. Accordingly, the pressure within the chamber 62 and the interior of the bearing D never exceeds a predetermined magnitude.

Completing the bearing assembly are a hub cap 82 and a supplemental seal 84. The hub cap 82 snaps into the ring 28 and covers the outboard end of the spindle C to generally isolate the outboard seal E from the surrounding atmosphere. The supplemental seal 84 fits into the hub B at its inboard end and has an elastomeric lip 86 which contacts a wear ring 88 that fits around the spindle C beyond the shoulder 12. The supplemental seal 84 further protects the inboard seal E. Even so, the lip 86 of the seal 84 is oriented such that it will flex to thereby relieve any increase in pressure within region occupied by the bearing D.

During the operation of the wheel assembly A, the primary and secondary lips 68 and 70 of the two seals E bear against the cylindrical wear surfaces 36 on the cone thrust ribs 34 that they encircle, there being a live or moving contact between the sealing edges 74 and 78 of the lips 68 and 70 and the wear surfaces 36. Moreover, the garter springs 76 urge the sealing edges 74 of the primary lips 68 against the wear surfaces 36, so that each seal E contacts its thrust rib for a full 360°. The primary seal lips 68 keep the lubricant within the bearing D, while the secondary seal lips 70 prevent contaminants from passing along the wear surfaces 36 and entering the interior of the bearing D. The vent lip 72 of each seal E, on the other hand, normally along its sealing face 80 contacts the outer radial wall 54 of its seal case 44, thereby preventing contaminants from entering the venting chamber 62.

Should the temperature of bearing D increase during operation, as might well occur, particularly if a brake assembly is mounted on the hub B, the pressure within the bearing D will likewise increase. However, the increase will be nominal, for vent lips 72 of the two seals E will tend to relieve the pressure so that the pressure on each side of the lips 72 tends to equalize. In this regard, an increase in pressure within the bearing D is transmitted to the venting chamber 62 of each seal by reason of the apertures 64 in the inner radial walls 58 of the seal cases 44. When the pressure differential across the lips 72 exceeds a predetermined magnitude, which is well below the differential required to invert the primary lip 68 or to dislodge either seal E from the bearing D, the venting lip 72 of one seal E or the other will lift away from the outer radial wall 54 of its seal case 44 and thereby vent the interior of the bearing D. The pressure within the bearing D therefore does not exceed that required to deflect the vent lips 72, so the primary lips 68 are not urged against the wear surfaces 36 with excessive force during operation of the wheel assembly A. This prolongs the life of the seals E.

In this same vein, the bearing D may be lubricated without fear of damaging the seals E or dislodging them from the ends of the double cup 16. In this regard, when lubricant is forced into the fitting 10, it flows through the hole 8 to the groove 22 in the double cup 16. Upon filling the groove 22, it flows still further inwardly through the holes 20 in the cup 16 and into the space between the small ends of the two rows of rollers 40. This should normally provide adequate lubrication. However, it is impossible to determine the amount of lubricant within the bearing D, and the amount could well exceed the free space within the bearing D. When this occurs, the excess lubricant merely flows out of the bearing interior through the apertures 64 in the seal cases 44 of the two seals E and then into the venting chambers 62 of the cases 44. If the lubricant fills the venting chambers 62, the vent lips 72 will move away from the inner radial walls 58 of their respective seal cases 44 and allow the lurbicant to escape. Since the pressure differential at which the vent lips 72 move is far less than that required to dislodge the seals E from the double cup 16 or perhaps invert the primary lips 68, the seals E remain in place and in condition to effectively seal the ends of the bearing D. Thus, the bearing D can be relubricated without completely disassembling it, and this is particularly desirable in connection with large over-the-road trucks, for it reduces maintenance expenses and down-time considerably.

Should the pressure within the bearing D decrease below that of the ambient pressure, the secondary and vent lips 70 and 72 will prevent contaminants from entering the bearing D. However, even if contaminants are drawn past the lips 70 and 72, they still do not enter the bearing D. In the case of the secondary lips 70, the contaminants enter the spaces between the primary lips 68 and secondary lips 70. In the case of the vent lips 72, the contaminants enter the venting chambers 62, but are normally prevented from migrating further by the bearing lubricant which occupies the apertures 64 in the inner radial walls 58 of the seal cases 44.

The outer and inner radial walls 54 and 58 of the seal cases 44 may possess various configurations. For example, the outer radial wall 54 may be planar and normal to the axis of rotation, while the inner radial wall 58 has oblique sections separated by a section normal to the axis of rotation, with the vent apertures 64 being in the latter (FIG. 2). In a slightly different arrangement, the inner radial wall 58 may be oblique in its entirety (FIG. 3). On the other hand, both the outer and inner radial walls 54 and 58 may be planar and normal to the axis of rotation, but the outer radial wall 54 should have an offset to produce the venting chamber 62 between the two walls 54 and 58 (FIG. 4).

While the seal E previously described is installed in the bearing D itself, with slight modification of the hub B the seal E may be installed in the hub B or some other housing. In an arrangement of that nature, the seal case 44 would be fitted to the hub itself, while the elastomeric seal element 46 would contact a wear surface on the spindle C.

The apertures 64 which provide communication between the interior of bearing D and the venting chamber 62, may take the form of indentations or scallops on the inner radial wall 58 of the seal case 44. Also, the vent lip 72 may be mounted on the outer radial wall 54 and normally contact the inner radial wall 58.

This invention is intended to cover all changes and modifications of the example of the invention herein chosen for purposes of the disclosure which do not constitute departures from the spirit and scope of the invention.

What is claimed is:

1. A seal for isolating a region within a hollow member in which an interior member is disposed such that relative rotation between the two members is possible, said seal comprising: a generally rigid seal case configured to be secured to the hollow member, the case having an inner wall that is presented toward the isolated region and an annular outer wall that is presented away from the isolated region, the two walls being fixed in position with respect to each other and further being spaced apart to create an annular chamber between the walls, with the chamber being in communication with the isolated region; a first elastomeric seal lip of annular configuration mounted on the case and being adapted to contact the interior member, so as to form a barrier along the interior member notwithstanding relative rotation between the two members; and a second elastomeric seal lip of annular configuration mounted on one of the seal case walls and extended to the other of the seal case walls which it normally contacts along a generally circular area that is generally concentric with respect to the first seal lip so as to close the chamber between the two walls, the second seal lip being capable of flexing away from the other seal case wall in response to an increase in pressure within the chamber and the region isolated by the seal so as to prevent excessive pressure from developing within the isolated region.

2. A seal according to claim 1 wherein the walls extend generally radially with respect to the axis of the relative rotation between the two members.

3. A seal according to claim 2 wherein the first seal lip extends generally axially and has a generally axially directed surface area that is presented toward the region isolated by the seal.

4. A seal according to claim 2 wherein the seal case further includes an axially directed wall adapted to fit into the hollow member and wherein the inner and outer walls extend generally radially from the axially directed wall.

5. A seal according to claim 4 wherein the first seal lip extends generally axially within the confines of the axially directed wall of the seal case, but is presented radially inwardly from the axially directed wall.

6. A seal according to claim 4 wherein the axially directed wall and the inner and outer radial walls are all arranged in fixed and determined relation with respect to each other.

7. A seal according to claim 2 wherein the inner wall contains apertures that are located radially outwardly from the second seal lip to provide communication between the chamber and the region isolated by the seal.

8. A seal according to claim 7 wherein the second seal lip is mounted on the inner wall and normally contacts the outer wall at a location spaced radially inwardly from the location where it is mounted on the inner wall so that the second seal lip will flex radially inwardly in response to an increase in pressure within the chamber.

9. A seal according to claim 1 and further comprising a third elastomeric seal lip mounted on the case and adapted to contact the interior member, with the third lip being located between the first and second lips.

10. A seal according to claim 9 and further comprising an elastomeric base bonded to the inner wall of the seal case, and wherein the first, second and third seal lips are attached to and formed integral with the elastomeric base.

11. A seal according to claim 2 wherein the first seal lip is offset axially with respect to the annular chamber between the spaced apart seal case walls.

12. A circular seal comprising: a seal case having a pair of generally rigid spaced apart walls that are fixed in position with respect to each other and are configured and arranged such that an annular chamber exists between the walls; means for providing communication between the chamber and the region beyond one of the walls; a first annular seal lip mounted on one of the walls and adapted to contact a wear surface that is movable relative to the seal; and a second annular seal lip mounted on one of the walls and extended toward and normally contacting the other of the walls along a generally circular area that is generally concentric with respect to the first seal lip without moving circumferentially with respect to either of the walls, so as to provide a static seal along the other wall and thereby close the chamber, the second seal lip being sufficiently flexible wherein said second lip will move away from the other wall in response to an increase in pressure of predetermined magnitude within the chamber, whereby the pressure within the chamber and the region in communication with it does not exceed a predetermined magnitude.

13. A seal according to claim 12 wherein the case further includes mounting means adapted to be secured to a structure capable of supporting the seal, and the spaced apart walls extend from and are in fixed and determined position with respect to the mounting means.

14. A seal according to claim 13 wherein the mounting means includes an axially directed wall and the spaced apart walls extended generally radially from the axially directed wall.

15. A seal according to claim 14 wherein the means for providing communication includes apertures in one of the spaced apart walls.

16. A seal according to claim 14 wherein the first seal lip extends generally axially and is located directly radially inwardly from the axially directed wall of the seal case, the first lip further being offset axially from the annular chamber between the spaced apart walls.

17. A seal according to claim 12 and further comprising an elastomeric base attached to one of the spaced apart walls and the first and second seal lips are formed integral with and extend from the base.

18. A seal according to claim 17 and further comprising a third seal lip formed integral with and extended from the elastomeric base intermediate the first and second seal lips, the third seal lip also being adapted to contact the wear surface that is movable relative to the seal.

19. In a bearing assembly including an outer race, an inner race, rolling elements arranged in a row between the two races so that the one race may turn easily with respect to the other race, a bore at the end of the outer race, and a wear surface at the end of the inner race, an improved seal for isolating the region occupied by the rolling elements, said seal comprising: a generally rigid seal case having an axial wall that fits into the bore at the end of the outer race and inner and outer radial walls extended generally radially inwardly from the axial wall, the inner radial wall being presented toward the isolated region and the outer radial wall being presented away from the isolated region, the radial walls being spaced apart so that an annular chamber exists between them, with the chamber being in communication with the isolated region of the bearing; a first annular seal element mounted on the inner radial wall and extended to and contacting the wear surface; and a second annular seal lip mounted on one of the radial walls and extended toward and normally contacting the other radial wall along a generally circular area that is concentric with respect to the first seal lip so as to provide a static seal along the other wall and thereby close the chamber, the second seal lip being capable of flexing when the pressure within the chamber and the isolated region of the bearing reaches a predetermined magnitude so that the pressure within the chamber is relieved, whereby the pressure within the isolated region does not exceed the predetermined magnitude.

20. The structure according to claim 19 wherein the first seal lip extends generally axially from the inner radial wall toward the rolling elements, so as to have a radially outwardly presented surface that is exposed to the isolated region, and is offset axially with respect to the chamber between the spaced apart radial walls.

21. The structure according to claim 20 wherein the communication between the chamber and the isolated region is through apertures located in the inner radial wall radially outwardly from the second seal lip.

22. The structure according to claim 20 and further comprising an elastomeric base bonded to the inner radial wall of the seal case, and wherein the first and second seal lips are formed integral with and extend from the base.

23. The structure according to claim 19 and further comprising means for directing a lubricant under pressure into the isolated region.

* * * * *